(12) United States Patent
Yanniello et al.

(10) Patent No.: US 10,008,837 B2
(45) Date of Patent: *Jun. 26, 2018

(54) BUS BAR APPARATUS USABLE IN HIGH-TEMPERATURE CABLE TERMINATION APPLICATIONS

(71) Applicant: EATON CORPORATION, Cleveland, OH (US)

(72) Inventors: Robert Yanniello, Asheville, NC (US); David Glenn Loucks, Coraopolis, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/213,649

(22) Filed: Jul. 19, 2016

(65) Prior Publication Data

US 2016/0329691 A1 Nov. 10, 2016

Related U.S. Application Data

(63) Continuation of application No. 14/471,112, filed on Aug. 28, 2014, now Pat. No. 9,397,456.

(51) Int. Cl.
| | |
|---|---|
| *H02B 1/56* | (2006.01) |
| *H02B 1/20* | (2006.01) |
| *H01R 25/16* | (2006.01) |
| *H01R 13/533* | (2006.01) |
| *H02B 13/035* | (2006.01) |

(52) U.S. Cl.
CPC ........... *H02B 1/565* (2013.01); *H01R 13/533* (2013.01); *H01R 25/162* (2013.01); *H02B 1/20* (2013.01); *H02B 1/56* (2013.01); *H02B 13/0358* (2013.01)

(58) Field of Classification Search
CPC ...... H02G 5/10; H01R 25/162; H01R 13/533; H02B 1/56; H02B 1/565; H02B 1/20; H02B 13/0358
USPC .................................................. 361/600–678
See application file for complete search history.

(56) References Cited

U.S. PATENT DOCUMENTS

| | | | |
|---|---|---|---|
| 6,574,094 B1 | 6/2003 | Morrow | |
| 8,755,187 B2 | 6/2014 | Zhang | |
| 9,397,456 B2 * | 7/2016 | Yanniello | ................. H02B 1/56 |

(Continued)

*Primary Examiner* — Zachary M Pape
(74) *Attorney, Agent, or Firm* — Eckert Seamans (57) ABSTRACT

An improved bus bar apparatus is usable in high temperature electrical terminations and is configured to provide sufficient heat dissipation such that when connected at one end with a 90° C. wire, the bus bar apparatus is at most only at 75° C. at another end thereof, which end can be connected with a lower temperature electrical component such as a circuit interrupter. The bus bars apparatus may include bus bars that extend directly between the high temperature wires and the low temperature electrical component, or the bus bar apparatus may additionally include wires that are electrically interposed between the low temperature region of the bus bars and the electrical component. Additional cooling could be provided by employing oversized wires. The bus bars may additionally include fins, fans, or supplementary heat sinks to enhance thermal convection of the bus bar. The bus bar apparatus additionally can be provided with its own enclosure to be usable in a retrofit situation.

18 Claims, 8 Drawing Sheets

(56) References Cited

U.S. PATENT DOCUMENTS

| | | | |
|---|---|---|---|
| 2002/0122289 A1* | 9/2002 | Meiners | H01H 85/47 361/676 |
| 2012/0113569 A1* | 5/2012 | Peralta | H02G 5/10 361/676 |

* cited by examiner

BUS BAR APPARATUS USABLE IN HIGH-TEMPERATURE CABLE TERMINATION APPLICATIONS

CROSS REFERENCE TO RELATED APPLICATION

The instant application claims priority from U.S. patent application Ser. No. 14/471,112 filed Aug. 28, 2014, now U.S. Pat. No. 9,397,456, the disclosures of which are incorporated herein by reference.

BACKGROUND

Field

The disclosed and claimed concept relates generally to electrical connection equipment and, more particularly, to a bus bar apparatus that enables line conductors at a relatively higher temperature to be connected with circuit interrupters having a relatively lower maximum temperature limit.

Related Art

Electrical distribution equipment is well known in the related art. For instance, electrical wires that extend from one location to another often are connected with circuit interruption devices such as circuit breakers, switches, fuses, and the like without limitation. The electrical wires themselves can be supported in any of a variety of fashions between the two points. One exemplary support methodology is to run the electrical wire through conduit, although the wires typically can be operated only at a relatively modest temperature since the conduit completely encloses the electrical wire therein and thus generally prevents any direct ambient cooling of the wire. Another exemplary support is a cable tray that typically is suspended from a ceiling or protrudes from a wall and that has an open tray within which the electrical wires are disposed when being run between one location and another. Electrical wires in cable trays typically can be operated at relatively higher temperatures due to the ambient cooling effect of the air that is contact with the wires as they lay in the cable tray.

For one electrical wire to be operable at a relatively higher temperature than another electrical wire, the electrical wire must employ insulation that is rated for operation at the relatively higher temperature. For example, certain electrical wire may be rated for operation at a temperature of 90° C. whereas other electrical wire may be rated for operation at temperatures no higher than 75° C. The electrical wire rated for 90° C. typically will be more costly than the wire of the same size that is rated only for 75° C. On the other hand, the electrical wire that is rated at 90° C. will be capable of operation at a higher ampacity, i.e., at a higher current carrying level, than the wire rated only for 75° C., even if the two wires are of the same wire gauge. Depending upon the particular current-carrying needs of the given application, therefore, it has been known to employ, in appropriate circumstances, a single run of 90° C. wire to be operated at a relatively higher ampacity in place of, for example, two runs of 75° C. wire that would have been operated at a relatively lower ampacity as long as the single run of 90° C. wire can meet the current-carrying requirements of the given application.

It is also understood, however, that certain electrical components such as circuit interrupters and the like are typically permitted to be connected with electrical conductive elements that are at most only of a given temperature, such as 75° C. Thus, while the running of a single 90° C. wire may be more cost effective than running two runs of 75° C. wire, the 90° C. wire cannot be directly connected with an electrical component such as a circuit interrupter because the relatively higher temperature might undesirably increase the temperature of the circuit interrupter, thereby causing it to operate in an erratic and unpredictable fashion, which is undesirable. A run of 90° C. wire thus cannot be specified for use in a given application if the wire is to be connected with a circuit interrupter or other device than can only be connected with electrical conductors that are at most only 75° C. Further difficulty is encountered if an electrical contractor failed to realize that a run of wire was to be connected with a circuit interrupter and therefore erroneously specified the installation of a run of 90° C. wire. In such a situation, the technician desirably would detect the use of 90° C. wire prior to connecting it with the circuit interrupter, thereby avoiding problems with the installation, but this often may occur only after the 90° C. run of wire has already been installed. In such a situation, it is typically necessary to remove the 90° C. wire and replaced it with 75° C. wire, likely multiple runs, or take other remedial action, at considerable additional expense. It thus would be desirable to provide an improved system that overcomes these and other shortcomings known in the relevant art.

SUMMARY

An improved bus bar apparatus is usable in high temperature electrical terminations and is configured to provide sufficient heat dissipation such that when connected at one end with a 90° C. wire, the bus bar apparatus is at most only at 75° C. at another end thereof, which end can be connected with a lower temperature electrical component such as a circuit interrupter. The bus bars apparatus may include bus bars that extend directly between the high temperature wires and the low temperature electrical component, or the bus bar apparatus may additionally include wires that are electrically interposed between the low temperature region of the bus bars and the electrical component. The bus bars may additionally include fins or supplementary heat sinks to enhance thermal convection of the bus bar. The bus bar apparatus additionally can be provided with its own enclosure to be usable in a retrofit situation where high temperature wire has already been installed and would otherwise need to be replaced with low temperature wire in the absence of the retrofit.

Accordingly, an aspect of the disclosed and claimed concept is to provide an improved bus bar apparatus having sufficient heat dissipation characteristics that it can be interposed between a high temperature wire and an electrical component that is rated for connection with electrical conductors that are at most only of a relatively lower temperature.

Another aspect of the disclosed and claimed concept is to provide such a solution either from the factory or as a retrofit solution.

Accordingly, an aspect of the disclosed and claimed concept is to provide an improved bus bar apparatus that is structured to be electrically connected between an electrical component and a number of electrical conductors that are situated at least partially on a cable tray. The bus bar apparatus can be generally stated as including an electrical enclosure, an electrical apparatus comprising a number of bus bars that are situated within the electrical enclosure, each bus bar of the number of bus bars being electrically conductive and having a first connection and a second connection, the first connection being structured to be electrically connected with an electrical conductor of the number of electrical conductors that is rated to be operable at no greater than a first temperature, the second connection being structured to be electrically connected with the electrical component that is rated to be electrically connectable with a conductive element that is at no greater than a second temperature, the second temperature being less than the first temperature, and each bus bar of the number of bus bars being of a length between the first and second connections and having a cross-sectional profile transverse to the length and between the first and second connections, the length and the cross-sectional profile being configured to enable the bus bar to dissipate sufficient heat within the electrical enclosure to retain the second connection at no greater than the second temperature while the first connection is at a temperature no greater than the first temperature.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
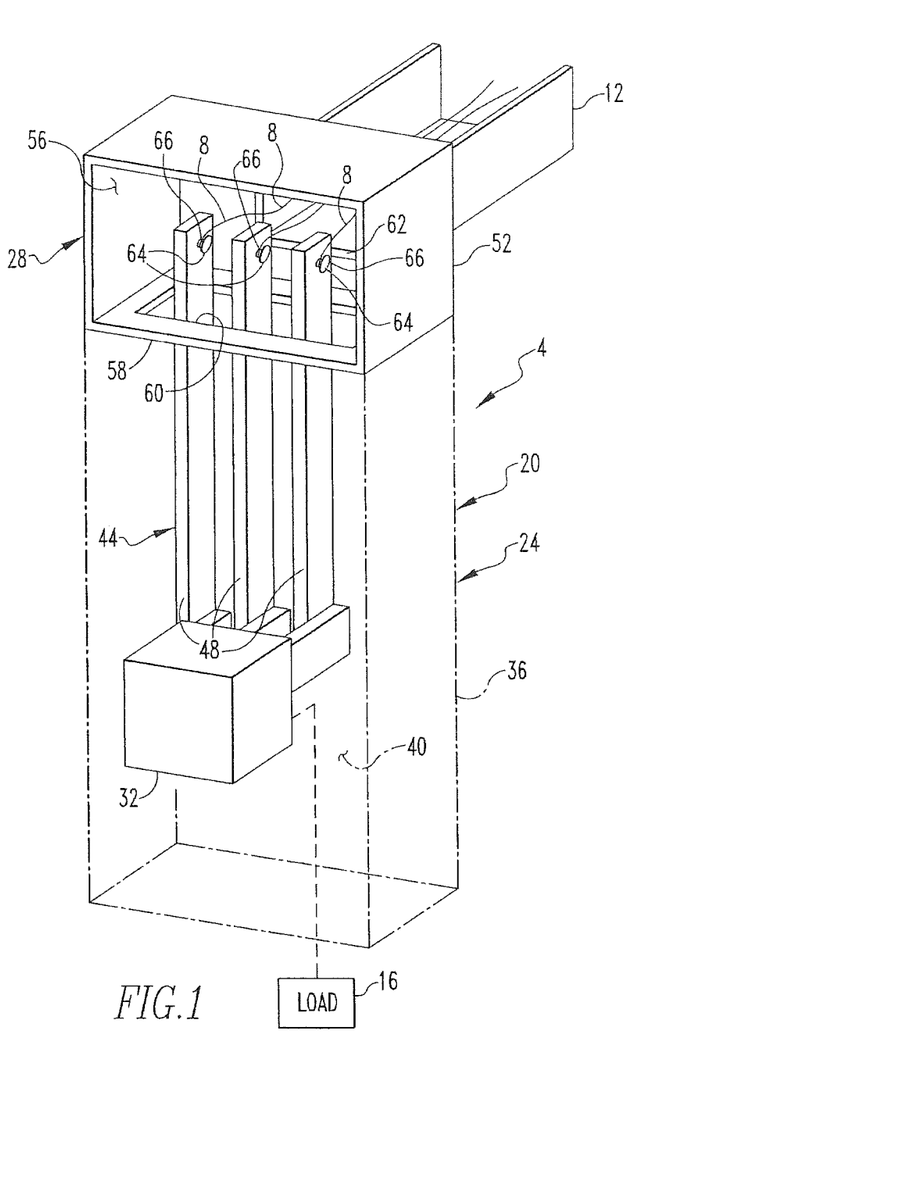
FIG. 1 is a schematic perspective view of an improved switchboard apparatus having a bus bar apparatus in accordance with a first embodiment of the disclosed and claimed concept.

An improved switchboard apparatus 4 in accordance with the first embodiment of the disclosed and claimed concept is depicted generally in FIG. 1. The switchboard apparatus 4 is depicted in FIG. 1 as being electrically connected with a plurality of line conductors 8 that are situated within an open cable tray 12. The switchboard apparatus 4 is further depicted as being connected with an electrical load 16.

The switchboard apparatus 4 includes a switchboard 24 and a bus bar apparatus 28. The switchboard apparatus 4 further includes an electrical enclosure 20. The electrical enclosure 20 is depicted herein in broken lines merely for purposes of ease of illustration of the interior thereof. The switchboard 24 includes a portion of the enclosure 20, and the bus bar apparatus 28 includes another portion of the enclosure 20. As will set forth in greater detail below, other embodiments of the switchboard apparatus employ the same or separate enclosures, and it is therefore noted that the exemplary enclosure 20 depicted in FIG. 1 is intended merely for purposes of illustration and is not intended to be limiting.

Figures 2, 2A:
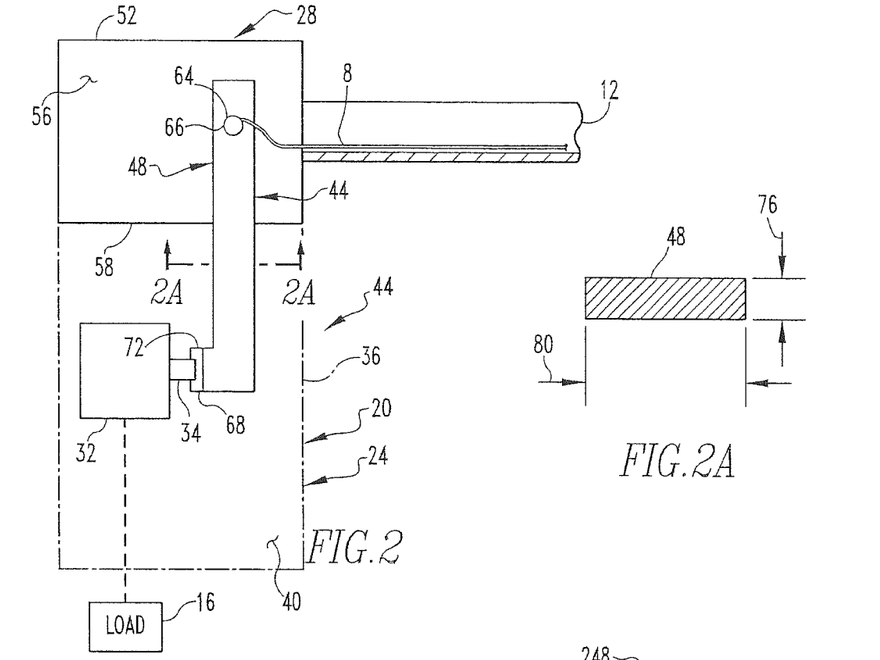
FIG. 2 is a side view of the switchboard apparatus of FIG. 1.
FIG. 2A is a sectional view as taken along line 2A-2A of FIG. 2.

The switchboard 24 includes an electrical component in the exemplary form of a circuit interrupter 32 having a number of terminals 34 that are depicted in a schematic fashion in FIG. 2. As employed herein, the expression "a number of" and variations thereof shall refer broadly to any non-zero quantity, including a quantity of one. The exemplary circuit interrupter 32 is configured to be connectable with conductive elements that are at a temperature of at most only 75° C. Furthermore, the line conductors 8 situated in the cable tray 12 are, in the depicted exemplary embodiment, rated for operation at 90° C. As will be set forth in greater detail below, the improved bus bar apparatus 28 enables the line conductors 8 to be electrically connected with the terminals 34 of the circuit interrupter 32 by dissipating sufficient heat. i.e., from the line conductors 8, that at the point of connection with the terminals 34 it is at a temperature that is at most only 75° C.

In the depicted exemplary embodiment, the switchboard 24 includes a first portion 36 of the enclosure 20. The first portion 36 has a first interior region 40 within which the circuit interrupter 32 is situated.

The bus bar apparatus 28 includes an electrical apparatus 44 and further includes a second portion 52 of the enclosure 20 having a second interior region 56. The electrical apparatus 44 includes a plurality of bus bars 48 that are electrically conductive and that are directly connected with the line conductors 8 and the terminals 34 of the circuit interrupter 32.

In the depicted exemplary embodiment, the enclosure 20 further includes a divider 58 which is a plate-like element having a hole 60 formed therein that provides communication between the first and second interior regions 40 and 56. The bus bars 48 extend through the hole 60 and are situated partially within each of the first and second interior regions 40 and 56. The second portion 52 of the enclosure 20 further has an opening 62 formed therein through which the line conductors 8 are received into the second interior region 56 for connection with the bus bars 48.

Each bus bar 48 includes a first connection 64 that is situated at a first location on the bus bar 48. In the depicted exemplary embodiment, the first connection 64 is a wire connection terminal 66 which enables one of the line conductors 8 to be electrically connected with one of the bus bars 48. Each bus bar 48 further includes a second connection 68 at a second location on the bus bar 48 that is spaced a distance from the first connection 64. In the depicted exemplary embodiment, the second connection 72 is a stab assembly, although in other embodiments it could be a threaded fastener or other fastening structure that enables the terminals 34 of the circuit interrupter 32 to be securely electrically connected with the bus bars 48 at the second location thereon.

As can be understood from the foregoing, when the line conductor 8 is connected with the first connection 64, the temperature of the bus bar 48 at the first connection 64 is at a temperature of at most 90° C. in the exemplary embodiment described herein. As can also be understood from the foregoing, when one of the terminals 34 of the circuit interrupter 32 is connected with the second connection 68, the temperature of the bus bar 48 at the second connection 68 is permitted to be no more than 75° C. The bus bars 48 thus are each advantageously configured to be of a size that is sufficiently large to dissipate on a steady-state basis sufficient heat that the temperature of the bus bars 48 at the second connection 68 is no greater than 75° C. when the temperature of the bus bars 48 at the first connection 64 is at 90° C. This is accomplished, for instance, by configuring the dimensions or other features of the bus bars 48 to be of sufficient size to provide between the first and second connections 64 and 68 a temperature gradient that is of sufficient magnitude that the temperature at the second connection 68 never exceeds 75° C. The vertical orientation of the bus bars 48 enables a chimney-like effect to increase convective airflow, which likewise helps to maintain the temperature at the second connection 68 so that it never exceeds 75° C.

For example, FIG. 2A depicts the bus bars 48 as having a cross-sectional profile transverse to the longitudinal extent of the bus bar 48 that is approximately rectangular and that has a thickness 76, and a width 80. The thickness 76 and the width 80, together with the length of the bus bar 48 between the first and second connections 64 and 68, are sized to provide sufficient convective and radiative heat transfer away from the bus bar 48 that the second connection 68 is maintained at no more than 75° C., even when the first connection 64 is at 90° C. The particular dimensions of the thickness 76, width 80, and length of the bus bar 48 between the first and second connections 64 and 68 typically will be configured for the particular application based upon the ampacity requirements of the application, the physical dimensions of the enclosure 20, the expected ambient temperature outside the enclosure 20, expected air flow through the enclosure 20, and other factors that are readily ascertainable and which can readily result in any of a variety of easily ascertainable dimensions for the bus bars 48 that will achieve the desired thermal properties within the confines of the enclosure 20.

Figure 2B:
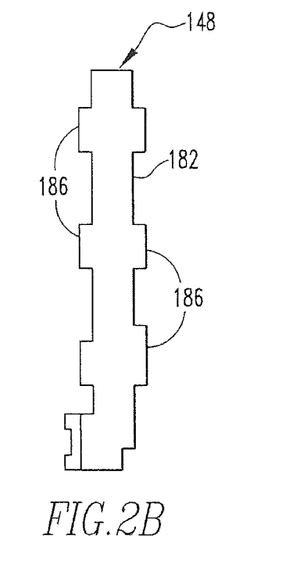
FIG. 2B is a view similar to FIG. 2, except depicting an alternative bus bar that includes fins as a convention enhancement portion.
Figure 2C:
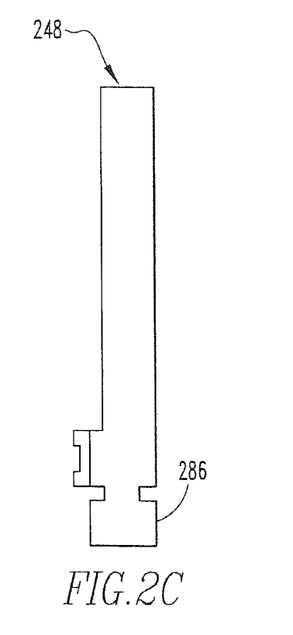
FIG. 2C is another alternative bus bar having a supplementary heat sink as a convention enhancement portion.

Depending upon the needs of the particular application, it may be desirable to employ an alternative bus bar 148 as is depicted in a schematic fashion in FIG. 2B or a further alternative bus bar 248 that is depicted in a schematic fashion in FIG. 2C. The exemplary bus bar 148 and the exemplary bus bar 248 can be substituted for the bus bars 48 depending upon the particular needs of the given application.

The bus bar 148 includes what can be considered to be an electrically conductive portion 182 which, in the depicted exemplary embodiment, is similar to the entirety of the bus bar 48. The conductive portion 182 is understood to possess its own thermal convective, radiative, and conductive properties that can dissipate certain heat received from the line conductors 8. However the bus bar 148 additionally includes a number of fins 186 that protrude outwardly from the electrically conductive portion 182 and which serve as convection enhancement portions that are configured to convectively dissipate additional heat beyond what could be dissipated by the electrically conductive portion 182 on its own. The fins 186 are thermally conductively connected with the electrically conductive portion 182 and protrude outwardly therefrom and serve to increase the surface area of the material that is in contact with air, thus enhancing the overall convective and radiative heat transfer properties of the bus bar 148 beyond that provided merely by the bus bar 48. While in the depicted exemplary embodiment the fins 186 are formed from the same material as the electrically conductive portion 182, it is understood that any appropriate material can be employed without departing from the present concept. It is also understood that any type of fins that are thermally conductively connected with the electrically conductive portion 182 can be employed without departing from the present concept.

The exemplary alternative bus bar 248 includes a heat sink 286 that is thermally conductively connected with the electrically conductive portion of the alternative bus bar 248. The heat sink 286 can likewise be formed of any of a variety of materials that are appropriate to the given application.

Figure 3:
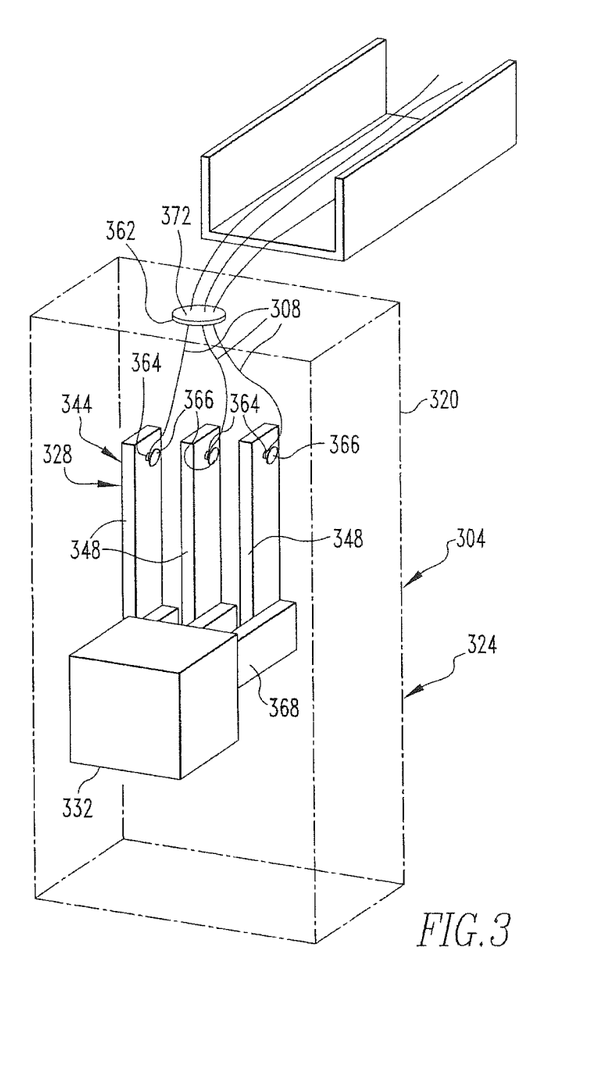
FIG. 3 is a schematic perspective view of an improved switchboard apparatus in accordance with a second embodiment of the disclosed and claimed concept.

An improved switchboard apparatus 304 in accordance with a second embodiment of the disclosed and claimed concept is depicted generally in FIG. 3. The switchboard apparatus 304 is similar to the switchboard apparatus 4, except that it includes an enclosure 320 having an opening 362 formed therein through which a number of line conductors 308 are received into an interior region of the enclosure 320. The switchboard apparatus 304 includes a switchboard 324 and a bus bar apparatus 328 that both employ the same enclosure 320 and are both situated within the interior region thereof. The bus bar apparatus 328 includes an electrical apparatus 344 that includes a plurality of bus bars 348 that are of a different shape than the bus bars 48, although the bus bars 348 are likewise configured to have dimensions and other properties that cause them to dissipate sufficient heat between the line conductors 308 and the terminations at the connected electrical component 332 to enable the terminations to be at a temperature no greater than 75° C.

The line conductors 308 within the opening 362 are retained therein by a clamping gland 372 that provides a barrier between the interior region of the enclosure 320 and the exterior thereof.

Despite the bus bars 348 being of a different configuration than the bus bars 48, the bus bars 348 each still include a first connection 364 in the form of a wire connection terminal 366 and a second connection 368 that is spaced from the first connection 364. Again, the bus bars 348 are configured to possess thermal convective, radiative, and conductive properties sufficient to maintain the second connection 368 at a temperature no greater than 75° C. while the first connection 364 is at a temperature as high as 90° C. within the confines of the enclosure 320. The bus bars 348 can additionally be configured to include fins, heat sinks, heat pipes, and/or fans, and the like, as can any of the bus bars described herein, without departing from the present concept.

Figure 4:
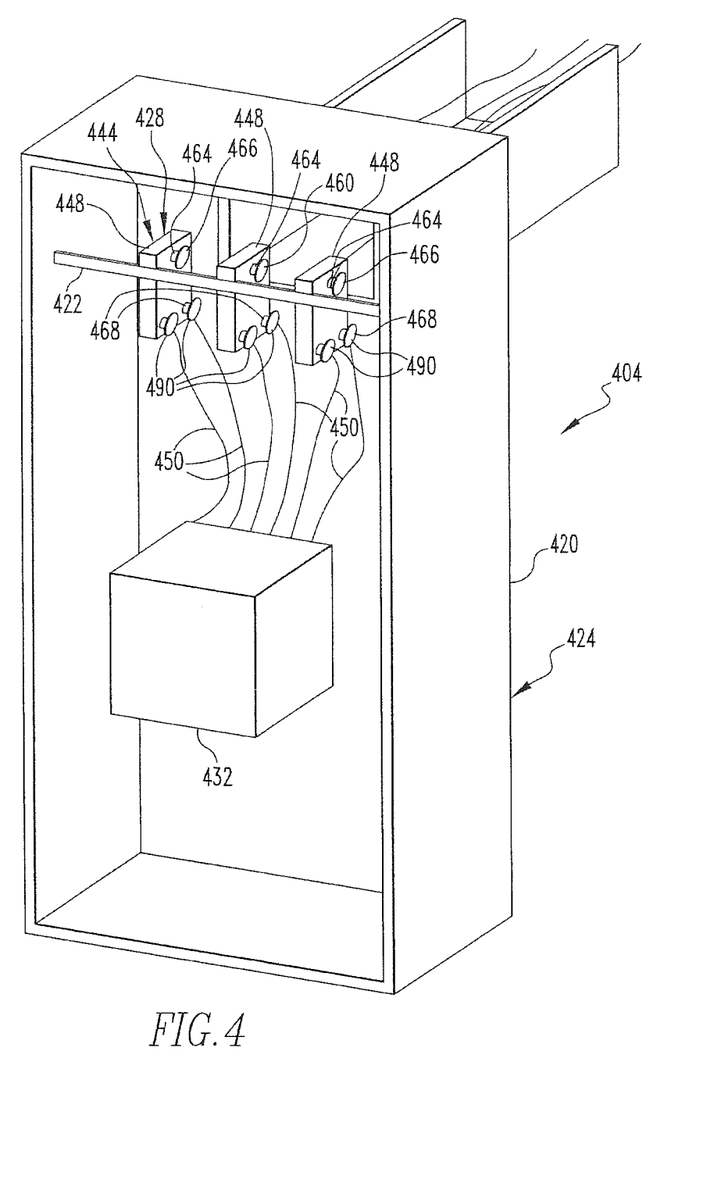
FIG. 4 is a schematic perspective view of an improved switchboard apparatus in accordance with a third embodiment of the disclosed and claimed concept.

An improved switchboard apparatus 404 in accordance with a third embodiment of the disclosed and claimed concept is depicted generally in FIG. 4. The switchboard apparatus 404 includes a switchboard 424 and a bus bar apparatus 428 that both employ an enclosure 420 and are situated generally within the interior region thereof. The bus bar apparatus 428 includes an electrical apparatus 444 that includes a set of bus bars 448 and a set of wires 450 that extend between the bus bars 448 and the circuit interrupter 432. In the depicted exemplary embodiment, the enclosure 420 includes a support apparatus 422 that is insulative and that is attached to the walls of the enclosure 420. The bus bars 448 are supported on the support apparatus 422 and are electrically insulated from one another and from the enclosure 420.

The bus bars 448 each include a first connection 464 in the exemplary form of a wire connection terminal 466 and further include a second connection 468 that is spaced from the first connection 464 and that comprises a plurality of wire connection terminals 490. As before, the bus bars 448 are configured to have sufficient dimensions and other properties such as fins and heat sinks that enable the bus bars 448 to maintain the second connection 468 at a temperature no greater than 75° C. while the first connection 464 is at a temperature of 90° C., by way of example. Another option is to oversize the set of wires 450 to not exceed 75° C. when carrying rated current in the enclosure 420. This might require additional cables. This oversizing could provide cooling. A further design would likely include elements of both a specially designed bus 448 and an oversized set of wires 450. The switchboard apparatus 404 is appropriate and desirable in circumstances where, for example, the requirement for such bus bars 448 between the line conductors and the circuit interrupter 432 is well known in advance. As such, the enclosure 420 is a single electrical enclosure that serves as the enclosure for both the switchboard 424 and the bus bar apparatus 428.

Figure 5A:
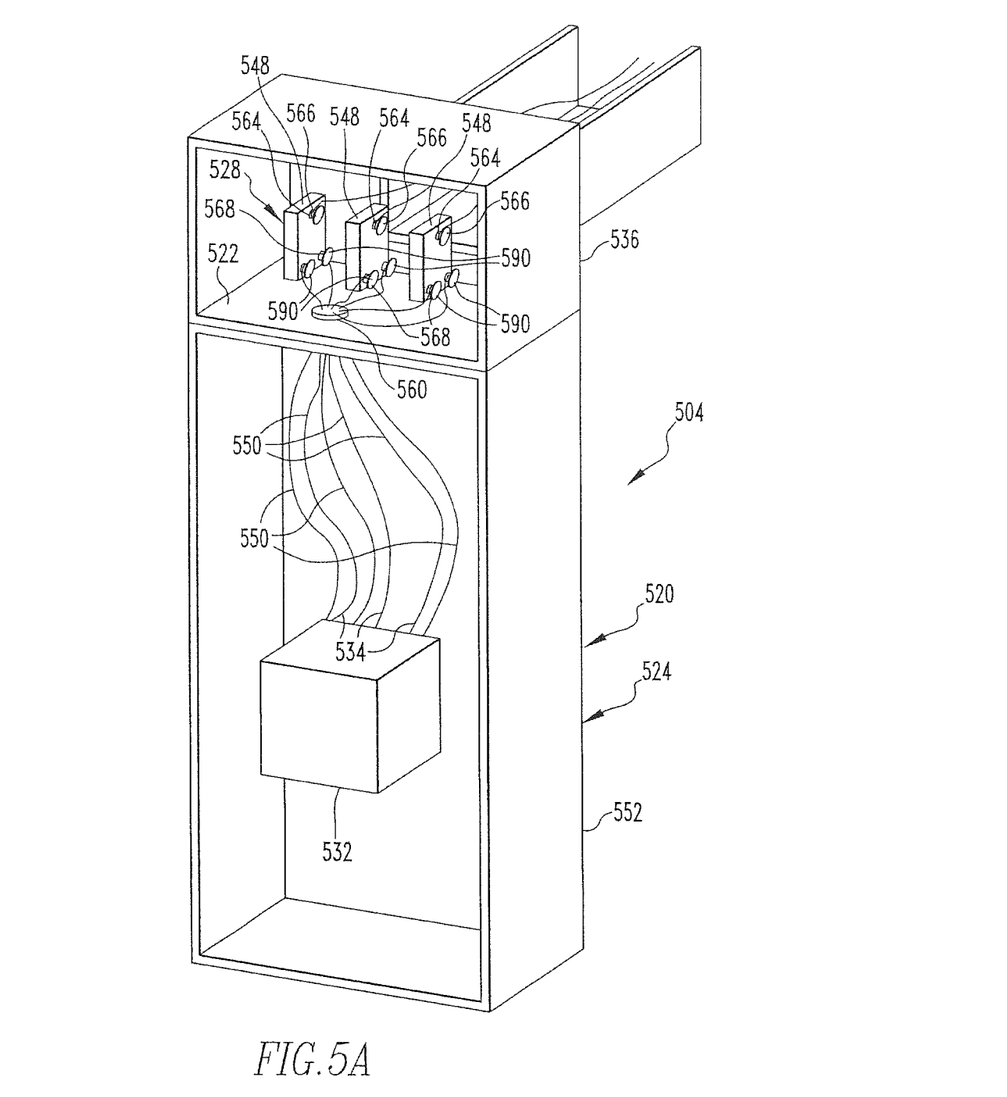
FIG. 5A is a schematic perspective view of an improved switchboard apparatus in accordance with a fourth embodiment of the disclosed and claimed concept.
Figure 5B:
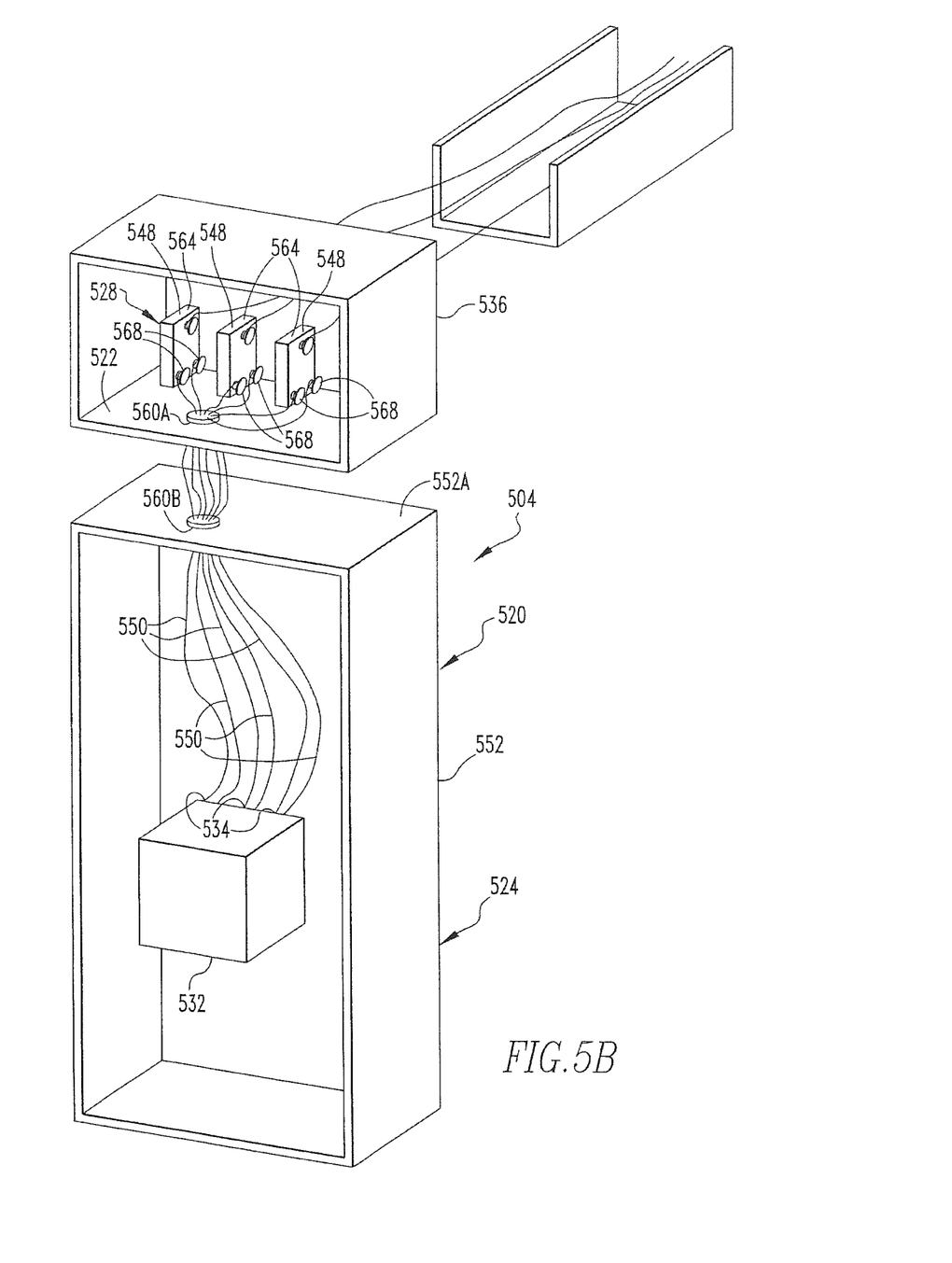
FIG. 5B is a view similar to FIG. 5A, except depicting the switchboard apparatus of FIG. 5A in an exploded configuration.

An improved switchboard apparatus 504 in accordance with a fourth embodiment of the disclosed and claimed concept is depicted generally in FIG. 5A and FIG. 5B. The switchboard apparatus 504 includes an enclosure 520 that includes a first portion 536 and a second portion 552 that are separate from one another, as is depicted generally in FIG. 5B, but that are capable of being assembled together is generally in FIG. 5A.

The switchboard apparatus 504 includes a switchboard 524 and a bus bar apparatus 528. The switchboard 524 includes a circuit interrupter 532 having a set of terminals 534 and further includes the first portion 536 of the enclosure 520 within whose interior region the circuit interrupter 532 is situated. The bus bar apparatus 528 includes an electrical apparatus 544 having a set of bus bars 548 and a set of wires 550 and further includes the second portion 552 of the enclosure 520. The second portion 552 includes a support apparatus 522 mounted to the walls thereof that is insulative and upon which the bus bars 548 are mounted.

As can be understood from FIG. 5B, the support apparatus 522 is of a plate-like configuration and has a hole 560A formed therein which is depicted as having a clamping gland installed therein. A wall 552A of the first portion 536 likewise has another hole 560B formed therein which is likewise depicted as having a clamping gland installed therein. When the first and second portions 536 and 552 are mechanically fastened together, the holes 560A and 560B are aligned with another and can receive the wires 550 therethrough to enable the wires 550 to extend between the interior region of the first portion 536 and the interior region of the second portion 552.

The bus bars 548 are depicted as being configured in a fashion similar to the bus bars 448 and as likewise having a first connection 564 that is in the exemplary form of a wire connection terminal 566 and as further having a second connection 568 that is spaced a certain distance from the first connection 564 and which includes a plurality of wire connection terminals 590. As before, the bus bars 548 are configured to maintain the second connection 568 at a temperature no greater than 75° C. when the first connection 564 is maintained at a temperature of 90° C., by way of example, and the particular dimensions thereof and the like are based upon the ampacity requirements of the particular application.

The switchboard apparatus 504, and more particularly the bus bar apparatus 528, are especially suited to a situation wherein the bus bar apparatus 528 is desired to be retrofitted to the switchboard 524 for any of a variety of reasons. As suggested above, it is possible that the application was wired with 90° C. line conductors without consideration for the fact that the circuit interrupter 532 could only be connected with electrical conductors that are at a temperature of no more than 75° C. By adding the bus bar apparatus 528 to the switchboard 524 to form the switchboard apparatus 504, the 90° C. wiring need not be replaced or supplemented, thus saving substantial cost. While the exemplary bus bar apparatus 528 is depicted herein as including a separate portion of the enclosure 520, it is understood that in other embodiments the bus bar apparatus 528 potentially could simply be the support apparatus 522 itself with the bus bars 548 and the wires 550 mounted thereto, with such an assembly being received within the interior region of the enclosure 520 and being mounted to the walls thereof with appropriate hardware or the like. Any of a variety of configurations of the bus bar apparatus 528 as a retrofitting device are possible without departing from the present concept.

Figure 6:
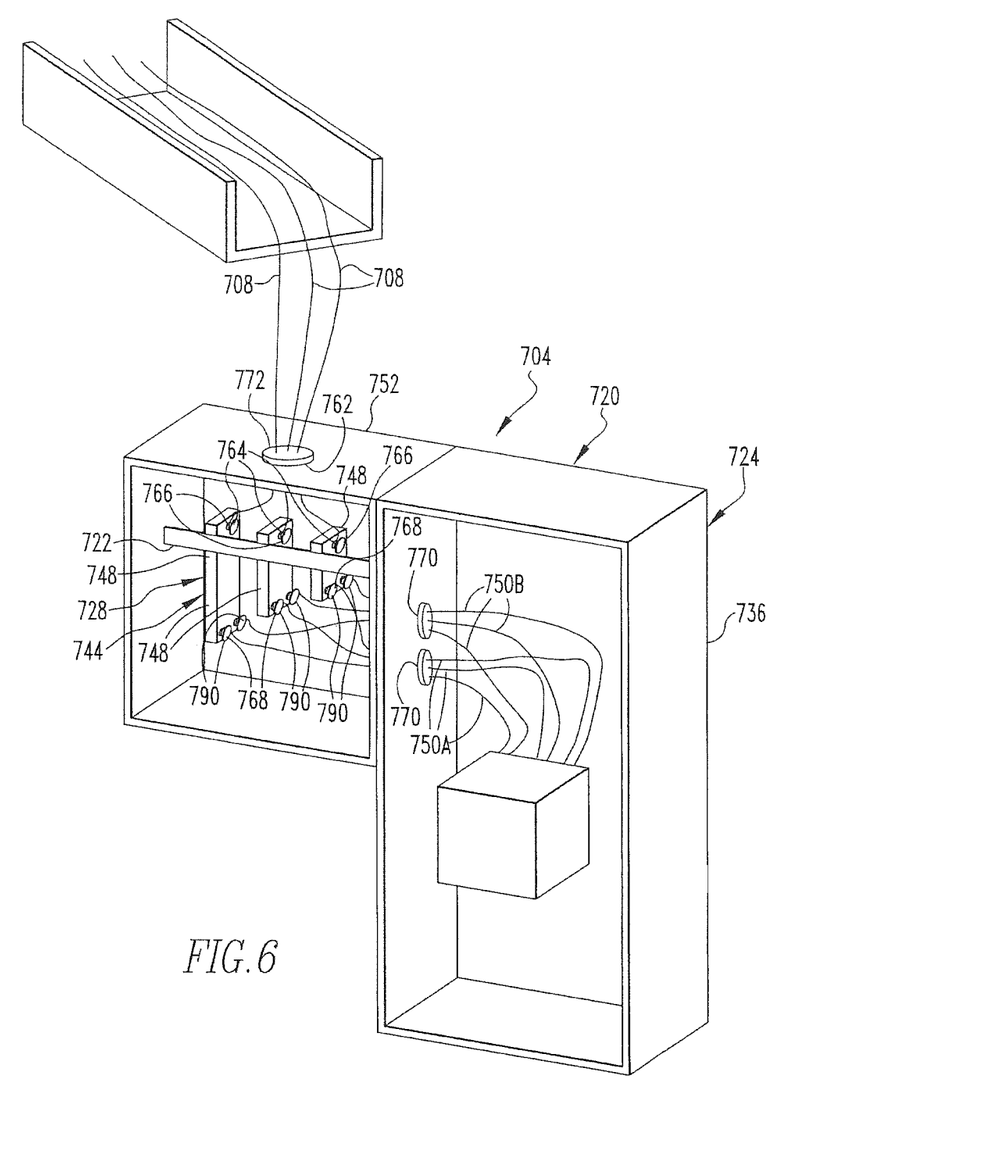
FIG. 6 is a schematic perspective view of an improved switchboard apparatus in accordance with a fifth embodiment of the disclosed and claimed concept.

An improved switchboard apparatus 704 in accordance with a fifth embodiment of the disclosed and claimed concept is depicted generally in FIG. 6. The switchboard apparatus 704 includes an enclosure 720 that is in the form of two separate enclosures that are described herein as being a first portion 736 and a second portion 752. The switchboard apparatus 704 includes a switchboard 724 and a bus bar apparatus 728, with the switchboard 724 including the first portion 736, and with the bus bar apparatus 728 including the second portion 752.

More particularly, the second portion 752 includes a support apparatus 722 that is insulative. The bus bar apparatus 728 additionally includes an electrical apparatus 744 having a plurality of bus bars 748 that are supported on the support apparatus 722 and further includes a set of wires 750A and 750B that are received through a pair of holes 770 that enable communication between the interior regions of the first portion 736 and the second portion 752. As can be understood from FIG. 6, the line conductors 708 extend through an opening 762 formed in the second portion 752 and connects with the bus bars 748 at a first connection 764 that is in the exemplary form of a wire connection terminal 766. The bus bars 748 additionally each include a second connection 768 that is in the form of a plurality of wire connection terminals 790 to which the wires 750A and 750B are electrically connected in a fashion similar to the switchboard apparatus 604. As before, the second connection 768 is spaced from the first connection 764, and the bus bars 748 are dimensioned and configured, along with the length and size of the wires 750A and 750B, to maintain the second connection 768 at no greater than 75° C. when the first connection 764 is at a temperature of 90° C., by way of example.

As can be understood from FIG. 6, the bus bar apparatus 728 is situated at the side of the switchboard 724. As was depicted above in connection with the switchboard 304, a clamping gland 772 situated in the opening 762 provides a seal between the interior of the bus bar apparatus 728 and the exterior thereof. The holes 770 are likewise depicted as having clamping glands received therein.

It is further noted that the three bus bars 748 are depicted in an exemplary fashion as being of different dimensions than one another. This is intended to illustrate the fact that the bus bars 748 need not be of the same physical configuration, and rather they can each be of any given configuration that is suited to the particular application as long as the overall configuration of each is sized to provide sufficient heat dissipation that the second connection 768 of each is maintained at no more than 75° C. when connected with one of the line conductors 708 at 90° C., by way of example. For instance, the dimensions of the enclosure may be dictated by the particular application, and identical bus bars may be incapable of being accommodated within the enclosure. However, by providing bus bars of different configurations that still meet the heat dissipation requirements of the application, the needs of the particular application can be met.

Figure 7:
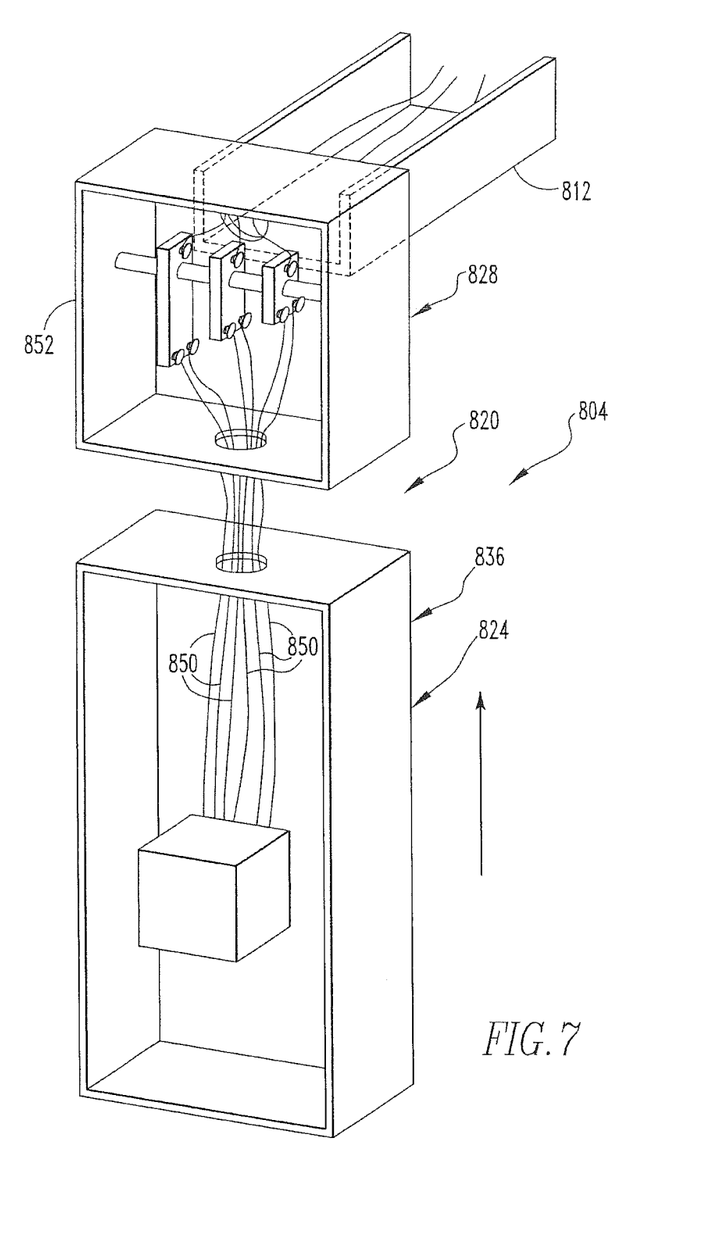
FIG. 7 is a schematic perspective view of an improved switchboard apparatus in accordance with a sixth embodiment of the disclosed and claimed concept.

An improved switchboard apparatus 804 in accordance with a sixth embodiment of the disclosed and claimed concept is depicted generally in FIG. 7. The switchboard apparatus 804 is similar to several of the other embodiments depicted herein, and FIG. 7 is intended to be depicted as having a bus bar apparatus 828 that is affixed to a cable tray 812. The switchboard apparatus 804 includes an enclosure 820 that is in the form of a first portion 836 and a second portion 852 that are separate from one another. The bus bar apparatus 828 includes the second portion 852, with the second portion 852 being affixed by appropriate hardware to the cable tray 812. The bus bar apparatus 828 includes a set of bus bars which, as set forth above, include a first connection and a second connection with sufficient heat dissipation between the first and second connections that a relatively hot line conductor connected at the first connection at 90° C. will still not heat the second connection of the bus bar above 75° C. Oversize wires 850 could also assist with such cooling. FIG. 7 depicts the bus bar apparatus 828 already being affixed to the cable tray 812 and showing the switchboard 824 being elevated upward into a position where the first and second portions 836 and 852 will be physically connected with one another.

It should be clear from the foregoing that numerous variations and combinations of features can be provided without limitation. Advantageously, the various bus bars depicted herein are each sized to meet the needs of the particular application in terms of ampacity and physical size while still providing enough heat dissipation that an electrical component connected at the second end of the bus bar will experience from the bus bar a temperature no greater than 75° C. while the bus bar has at a first connection a hot wire connected therewith that is being operated at 90° C. As mentioned above, any of the bus bars presented herein can be in any of a wide variety of configuration in terms of shape, length, cross-sectional profile, etc., and likewise in terms of having additional structures such as fins, heat sinks, and the like without limitation. It is also understood that the high temperature of 90° C. and the low temperature of 75° C. are intended merely for purposes of illustration and are not intended to be limiting.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An apparatus structured to be electrically connected between a number of electrical conductors rated to be operable at no greater than a first temperature and an electrical component rated to be operable at no greater than a second temperature that is less than the first temperature, the apparatus comprising:
  an electrical enclosure;
  a number of bus bars situated within the electrical enclosure;
  each bus bar being electrically conductive and having a first connection and a second connection spaced-apart from the first connection, the first connection being structured to be electrically connected to one of the number of electrical conductors, the second connection being structured to be electrically connected to the electrical component; and
  wherein the electrical component includes a number of terminals rated to be operable at no greater than the second temperature, and wherein at least one of the bus bars is structured to be electrically connected to at least one terminal of the electrical component via at least one wire.

2. The apparatus of claim 1 wherein the bus bar comprises an electrically conductive portion and further comprises a convection enhancement device that is thermally conductively connected with the electrically conductive portion.

3. The apparatus of claim 2 wherein the convection enhancement device comprises at least one of a fan, a heat sink that protrudes from the electrically conductive portion, a fin that protrudes from the electrically conductive portion, and a heat pipe that protrudes from the electrically conductive portion.

4. The apparatus of claim 1 wherein the electrical enclosure comprises an interior region and further comprises a divider element situated within the interior region that separates the interior region into a first portion and a second portion.

5. The apparatus of claim 4 wherein the divider element has a hole through which at least a portion of the at least one wire extends between the first and second portions of the interior region.

6. The apparatus of claim 4 wherein the number of bus bars are housed in the first portion of the interior region and the electrical component is housed in the second portion of the interior region.

7. The apparatus of claim 1 wherein the electrical enclosure is part of a switchboard apparatus.

8. The apparatus of claim 1 wherein the electrical enclosure comprises an interior region, and wherein the electrical enclosure has formed therein an opening through which the number of electrical conductors are structured to be received into the interior region.

9. The apparatus of claim 1, wherein the apparatus is structured to be retrofitted to another electrical enclosure.

10. The apparatus of claim 1 wherein the apparatus is structured to be retrofitted to a cable tray that carries the number of electrical conductors.

11. The apparatus of claim 1 wherein at least some of the bus bars of the number of bus bars each comprise as the first connection a wire connection terminal that is structured to be electrically connected with a conductor of the number of electrical conductors, and wherein at least some of the bus bars of the number of bus bars each comprise as the second connection a number of other wire connection terminals that are structured to be connected with a number of wires that comprise the at least one wire and that are electrically connected with the electrical component.

12. The apparatus of claim 1 wherein each bus bar is of a sufficient size and the space between the first and second connections is of a sufficient length to enable the bus bar to dissipate sufficient heat within the electrical enclosure, such that the temperature at the second connection is no greater than the second temperature.

13. The apparatus of claim 1 wherein the electrical component includes a circuit interrupter having a number of terminals that are rated to be operable at no greater than the second temperature.

14. The apparatus of claim 1 wherein the electrical conductors include wires that are rated to be operable at no greater than the first temperature.

15. An apparatus structured to be electrically connected between a number of electrical conductors rated to be operable at no greater than a first temperature and an electrical component rated to be operable at no greater than a second temperature that is less than the first temperature, the apparatus comprising:
    an electrical enclosure;
    a number of bus bars situated within the electrical enclosure;
    each bus bar being electrically conductive and having a first connection and a second connection spaced-apart from the first connection, the first connection being structured to be electrically connected to one of the number of electrical conductors, the second connection being structured to be electrically connected to the electrical component;
    wherein the electrical enclosure comprises an interior region, and wherein the electrical enclosure has formed therein an opening through which the number of electrical conductors are structured to be received into the interior region; and
    wherein the bus bar apparatus further comprises a number of wires that are electrically connected with at least some of the bus bars of the number of bus bars and that are structured to be further electrically connected with the electrical component, and wherein the electrical enclosure further has formed therein another opening through which at least a portion of at least one of the number of bus bars and the number of wires is structured to extend between the interior region and another interior region of another electrical enclosure within which the electrical component is situated.

16. A method of electrically connecting a number of electrical conductors rated to be operable at no greater than a first temperature to an electrical component rated to be operable at no greater than a second temperature that is less than the first temperature, the method comprising:
    installing a number of bus bars in an electrical enclosure, each bus bar being electrically conductive and having a first connection point and a second connection that is spaced apart from the first connection;
    electrically connecting at least one electrical conductor to the first connection point of a first bus bar of the number of the bus bars;
    electrically connecting an electrical component to the second connection point of the first bus bar; and
        wherein the electrical component includes a number of terminals rated to be operable at no greater than the second temperature, and wherein the step of electrically connecting the electrical component to the second connection point of the first bus bar includes connecting at least one wire between the electrical component and the second connection point of the first bus bar.

17. A bus bar apparatus structured to be electrically connected between a number of electrical conductors rated to be operable at no greater than a first temperature and an electrical component rated to be electrically connected with one or more conductive elements that are at no greater than a second temperature, the second temperature being less than the first temperature, the bus bar apparatus comprising:
    an electrical enclosure having an interior region;
    a number of bus bars situated within the electrical enclosure;
    a number of wires electrically connected with at least some of the bus bars of the number of bus bars and structured to be further electrically connected with the electrical component;
    the electrical enclosure having formed therein an opening through which the number of electrical conductors are structured to be received into the interior region;
    the electrical enclosure further having formed therein another opening through which at least a portion of at least one of the number of bus bars and the number of wires is structured to extend between the interior region and another interior region of another electrical enclosure within which the electrical component is situated; and
    each bus bar of the number of bus bars being electrically conductive and having a first connection and a second connection, the first connection being structured to be electrically connected with one of the number of electrical conductors, the second connection being electrically connected with one of the number of wires.

18. The bus bar apparatus of claim 17 wherein at least some of the bus bars of the number of bus bars each comprise as the first connection a wire connection terminal that is structured to be electrically connected with a conductor of the number of electrical conductors, and wherein at least some of the bus bars of the number of bus bars each comprise as the second connection a plurality of other wire connection terminals.

* * * * *